INVENTORS
Omar N. Revelo
George A. Revelo
BY Gustave Miller
ATTORNEY

Oct. 1, 1968 O. N. REVELO ET AL 3,404,224

AUDIO AND VIDEO TRANSMITTING AND RECEIVING SYSTEM FOR USE AS AN EDUCATIONAL DEVICE

Filed Nov. 23, 1964 3 Sheets-Sheet 2

INVENTORS
Omar N. Revelo
George A. Revelo
BY Gustave Miller
ATTORNEY

INVENTORS
Omar N. Revelo
George A. Revelo
BY Gustave Miller
ATTORNEY 3,404,224

AUDIO AND VIDEO TRANSMITTING AND RECEIVING SYSTEM FOR USE AS AN EDUCATIONAL DEVICE

Omar N. Revelo and George A. Revelo, both of 445 Ellington Ave., San Francisco, Calif. 94112

Filed Nov. 23, 1964, Ser. No. 413,158
11 Claims. (Cl. 178—7.1)

ABSTRACT OF THE DISCLOSURE

This invention is an audio and video transmitting and receiving system for use as an education device or the like, and includes a circular disc recording, rather than a tape recording, which circular disc has both audio and video information on the same side thereon which may be repeated on the reverse side. The audio information is transmitted through a phonograph needle to the audio circuit of a suitable connected conventional television set, the video information, in the form of a series of pictures, is transmitted by light conducting rods to a television pick up tube and thence to the video circuit of the television, the television set being thus connected in closed circuit for reproducing the audio and video information on the circular disc recording.

OBJECTS OF INVENTION

This invention relates to a television system and more particularly to an audio and video transmitting and receiving system for use as an educational device or the like wherein both the audio and video information can be displayed by an ordinary home television receiver.

In recent years its has become increasingly desirable to be able to display previously recorded information on ordinary home television receivers, particularly as a method of teaching, whereby either individual or group instructions can be obtained with a concurrent maximum utilization of the present short supply of good teaching talent. One system presently in use which has probably the greatest merit is the use of pre-recorded video tapes. However, both video tape recorders and reproducers are obtainable only at great cost and would not presently be economically practical for use in the home or for small groups requiring instruction.

In accordance with the present invention, there is provided a simple and relatively inexpensive system whereby both audio and video information can be recorded and then reproduced from the recording by means of a simple reproducing system for display by the ordinary home television receiver. Briefly, the above is accomplished by providing a laminated disc record designed for rotation on a turntable. The record is composed of three layers, two outer transparent layers, each formed of an ordinary transparent phonograph record material for recording sound and an inner layer for receiving either color or black and white pictures thereon whereby a phonograph record needle reproduces sound recorded on said outer layers and a light conducting rod reproduces the black and white or color pictures positioned on said inner layer in true color or black and white, as the case may be. The sound is positioned on the record so that it is synchronized with the picture being viewed by a light conducting rod. The audio is passed directly to the amplifier of the home television receiver for reproduction while the video information, on the other hand, passes through the light conducting rod to a shutter, the video information passing through the shutter to a normal closed circuit video pickup unit wherein the video signals are converted to electrical signals, the electrical signals being transmitted to the home television receiver to operate the video circuits therein.

It is therefore an object of this invention to provide a simple and inexpensive system for recording and reproducing audio and video information on a normal home television receiver.

It is a further object of this invention to provide a patentably novel recording medium for both audio and video information.

It is a still further object of this invention to provide a patentably novel and relatively inexpensive video reproducing system iutilizing a light conducting rod and a closed circuit video pickup system.

The above and still further objects of this invention will become immediately apparent to those skilled in the art from a consideration of the following description of a specific preferred embodiment of this invention, which is provided by way of example and not limitation when taken with the accompanying drawings wherein.

Figure 1:
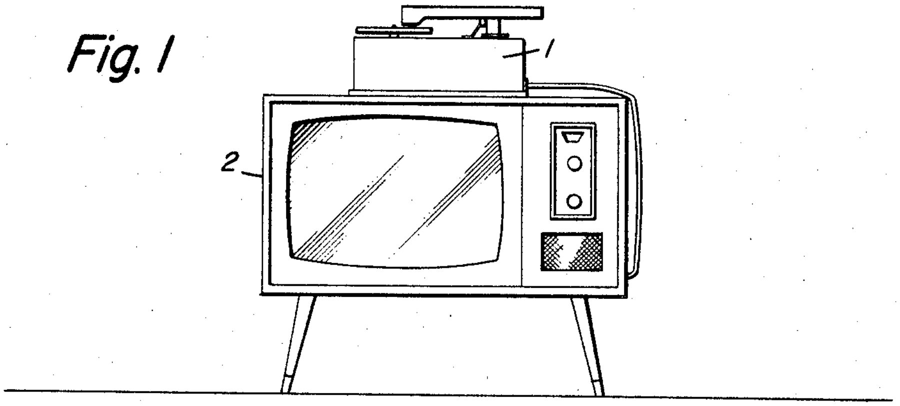
FIGURE 1 shows the invention mounted on an ordinary home television receiver.

Referring first to FIG. 1, there is shown the reproducing system 1 of the present invention coupled to the ordinary home television receiver 2 to provide a closed circuit television system.

Figures 2, 3:
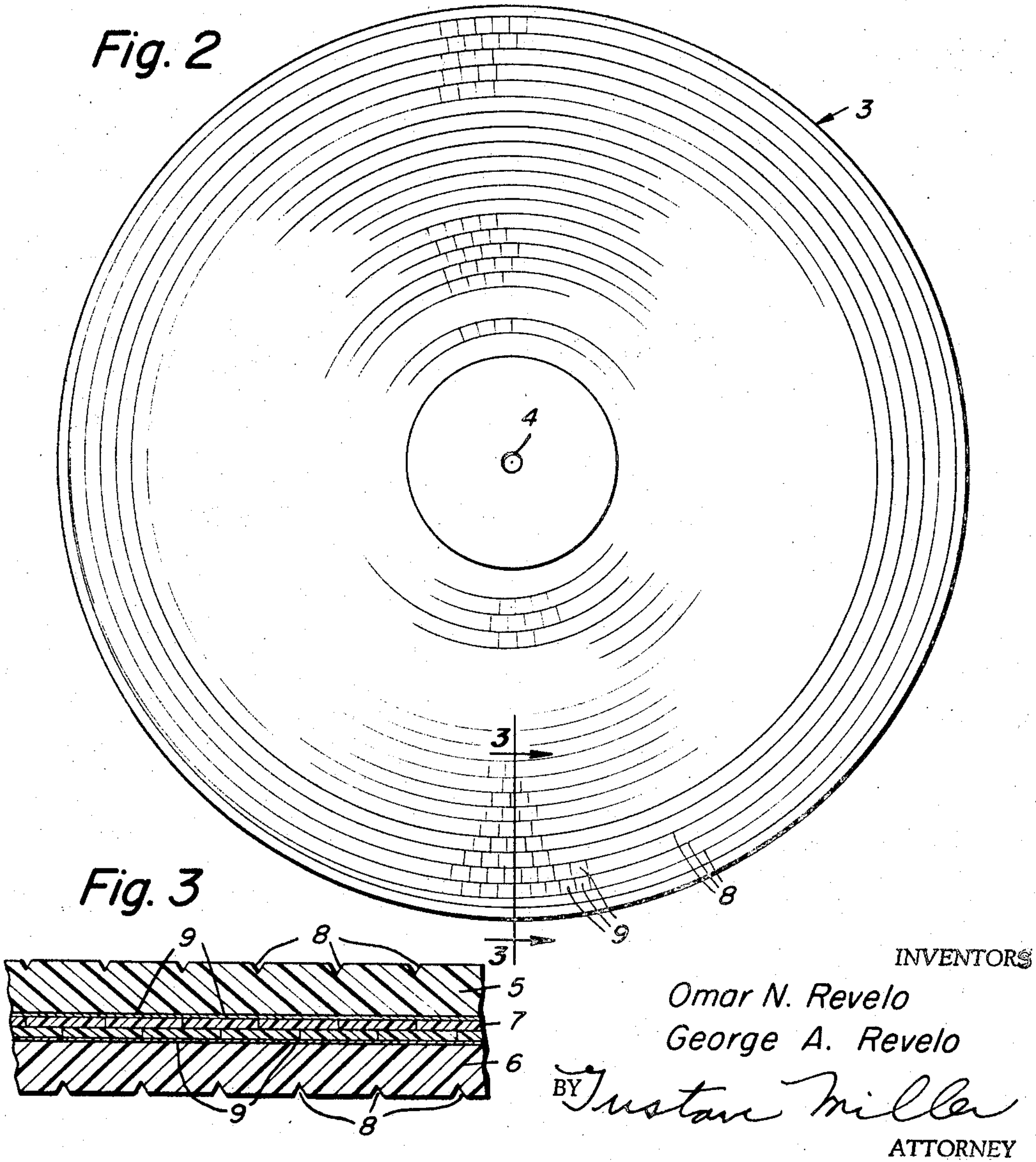
FIGURE 2 is a plan view of one side of the recording medium in accordance with the present invention.
FIGURE 3 is an enlarged section taken along the line 3—3 of FIGURE 2.

FIGURES 2 and 3 disclose the recording medium whereon the audio and video information is initially recorded prior to reproduction thereof. The recording medium 3 is in the shape of an ordinary circular phonograph record having an aperture 4 for receiving a spindle 14 therethrough. The medium 3 is composed of two outer transparent layers 5 and 6 and an intermediate layer 7, all secured together. The two outer layers contain grooves 8 wherein audio information is recorded in the manner well known in the recording art. The grooves 8 are spaced so that video information areas positioned on the layer 7 can be seen between the grooves 8 when placed at positions 9 on either side of the layer 7. It will be noted that the video information areas at 9 can be of almost any size.

The sole requirement is that, when the record disc is being rotated, there will be at least sixteen areas of video information scanned during each second of audio information to produce an illusion of motion syncronized with the sound being produced. Obviously, a greater number of areas, such as twenty-four, may be scanned per second, and the entire system will be syncronized according to the number of video areas to be scanned per second. To obtain this requirement, the areas will be positioned progressively closer together since the number of inches of record surface traversed per second decreases as the scanner moves toward the center of the record. The layers 5 and 6 could be formed of a transparent polyvinyl plastic or the like whereas the layer 7 is composed of any black and white or color picture receiving material such as paper, positive microfilm or the like.

Figures 4, 6, 9:
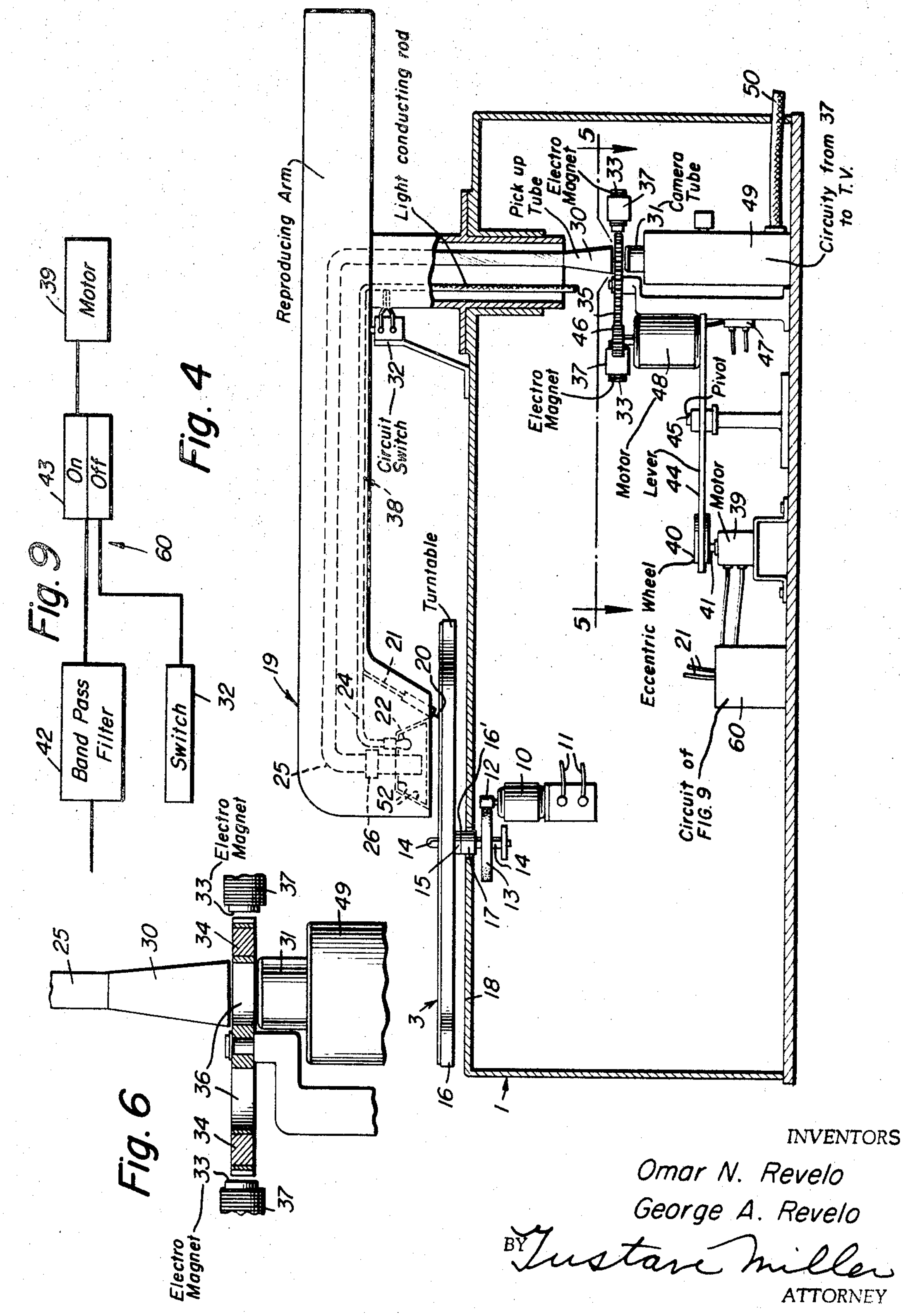
FIGURE 4 is a view partly in elevation and partly in section of the recording medium reproducing unit of this invention.
FIGURE 6 is a section taken along the line 6—6 of FIGURE 5.
FIGURE 9 is a block diagram of the circuitry in block 60 of FIGURE 4.

Referring now to FIG. 4, there is shown a blown up view of the internal structure of the reproducing system 1 of FIG. 1. A motor 10 having wiring 11 for connection to an external source of electric power, also includes a rotatable shaft having a friction wheel 12 mounted thereon. The friction wheel 12 is in frictional engagement with a friction disc 13 mounted on the shaft or turntable spindle 14. The shaft or spindle 14 is mounted in and secured to a base member 15 supporting a turntable 16, the base member 15 resting on a top bearing surface 16' of the bushing 17. The bushing 17 is secured to and through the casing 18. The recording medium 3 is positioned on the turntable 16.

Figure 8:
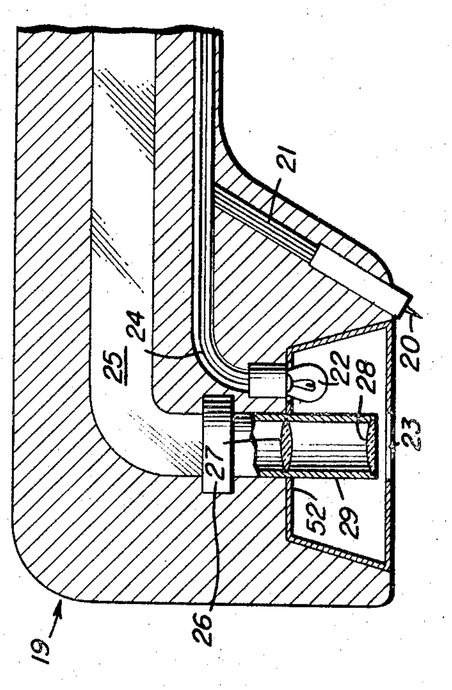
FIGURE 8 is a cross-section taken through FIGURE 7.
Figure 7:
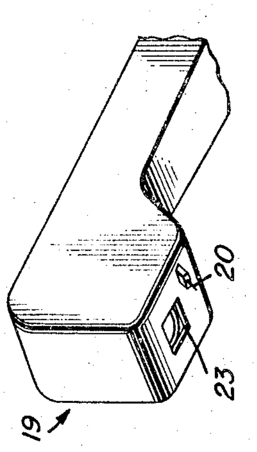
FIGURE 7 is a view in perspective of the pickup arm in accordance with the present invention.

A reproducing arm 19 (also shown in FIGS. 7 and 8) is provided to reproduce the audio information in grooves 8 and video information in areas 9 of the recording medium 3. The reproducing arm includes a standard phonograph record reproducing needle 20 for reproducing the audio information recorded in the grooves 8. This needle offset in the end of the reproducing arm 19, is coupled through the required and well known wiring 21 to an external sound reproducing circuit (not shown) which could be the audio amplifier and associated speaker system of the reproducing unit 2 of FIG. 1.

The video information on the areas 9 of the recording medium 3 is reproduced by illuminating the said video areas 9 by means of a lamp 22 and mirror surface 52 positioned behind an opening 23 in the arm 19, the lamp 22 being energized from a source of power (not shown) along the wires 24. The light is reflected onto the video areas by mirrors 52. The illuminated image itself, which is located in the video area 9, is sensed by the light conducting rod 25 through a joint 26 of a magnifying lens system to the light conducting rod 25. The lens system is composed of a double convex lens or eyepiece 27 and a very short focal length objective lens 28 which form a microscope type structure within the opaque tubular member 29.

The image detected by the lens system 27 and 28 is transmitted through the light conducting rod 25 to the enlarging portion 30 thereof.

The video picture is then transmitted from the enlarging portion of the light conducting rod 25 to the television pickup tube 31 (FIGS. 4 and 6) through an intervening shutter type system which is well known in the photographic motion projector art in the following manner to provide an illusion of motion.

Figure 5:
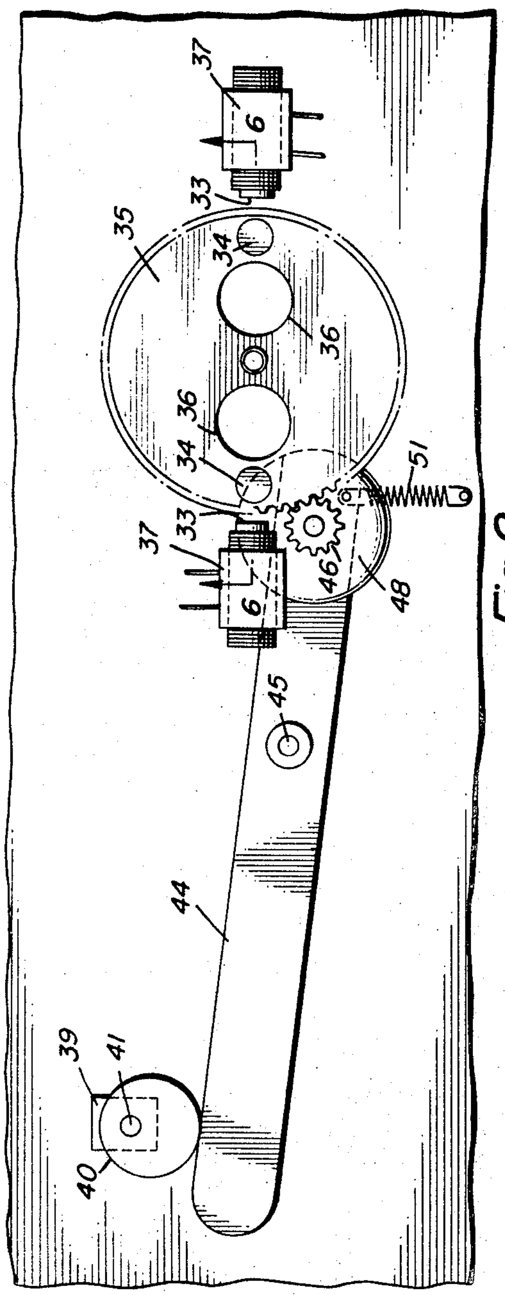
FIGURE 5 is a section taken along the line 5—5 of FIGURE 4.

A switch 32 is positioned beneath the arm 19 for controlling the electromagnets 33 FIGS. 4, 5 and 6) whereby the switch 32 is open when the arm 19 is either in the rest position or in the record playing position, thereby causing electromagnets 33 to be deenergized. When the arm 19 is lifted or finishes playing a record, the switch 32 will close and energize the electromagnets 33. The electromagnets 33 will then attract the magnetic material 34 on the non-magnetic gear shutter element 35 to position the gear element 35 and thereby align one of the apertures 36 therein so that one said aperture is aligned with the portion 30 of the light conducting rod and the camera tube 31 whereby the center of the aperture, the center of the light conductive rod and the center of camera tube 31 fall along the same line. The coils 37 about the electromagnets 33 are connected to the switch 32 by wires and a source of power (not shown) to provide a complete electrical circuit.

In order to start the entire mechanism in proper synchronism, a super audible sound recording is placed at the beginning of each groove 8 of the recording medium 3 just prior to the audio and video information recorded on the recording medium. This super audible sound recording is initially sensed by the audio reproducing needle 20 and provides an impulse to a circuit 38 along the conductor 21 to close said switch 32 and start a motor 39 coupled to an eccentric wheel 40 by a shaft 41. The super audible sound could be, for example, a high frequency super audible tone, which is passed through a filter circuit designed to pass only this frequency to operate the switch 32. A typical circuit 38 to perform this function is set forth in FIG. 9.

Referring to FIG. 9, the super audible sound is passed through a narrow band pass filter 42 tuned to the super audible sound. When a signal of the super audible frequency passes through the filter 42 for a sufficient period of time and is of sufficient amplitude, the flip flop 43 will be turned on and provide power to the motor 39 or, alternatively, operate a switch (not shown) such as a vacuum tube or transistor to provide power to said motor 39. The flip flop 43 is always reset when the arm 19 is lifted or when the record comes to an end if the super audible recorded sound at the end of the sound track 8 has not reset or turned off the flip flop 43 by providing a reset signal to the flip flop by closing the switch 32.

Referring again to the eccentric wheel 40, actuation or starting of the motor 39 causes the wheel 40 to turn one half revolution to rotate the lever 44 about the pivot 45 to engage the gear 46 with the gear 35 and simultaneously close the switch 47 to turn on the motor 48 and cause the gear 46 to rotate and thereby rotate the gear 35. The gear 35 also operates a Geneva movement or the like to allow light passing through the light conducting rod 25 to reach the pickup tube 31 at predetermined regularly spaced intervals (not shown). A typical device which could be connected to gear 35 and perform the above stated function is set forth in U.S. Patent No. 2,607,236. Swicth 47 also operates the lamp 22 and turns on this lamp when closed.

The motor 48 will turn at, for example, eight revolutions per second, this speed being synchronized with the speed of motor 10 and the position of audio information on the record 3 whereby sixteen images per second appear on the face of the tube 31. The tube 31 then converts the image on the face thereof by means of the well known circuitry 49 associated with such pickup tubes to electrical signals which are fed along the conductors 50 to the video circuitry of the television receiver 2.

The system operates in the following manner:

With the arm in the rest position, all motors are off and gears 35 and 46 are disengaged. Lifting of the arm 19 closes the switch 32 and provides power to energize electromagnets 33 and cause the magnetic elements 34 on gear 35 to be attracted to the electromagnets, thereby properly aligning gear 35. Placing of the arm 19 on the record 3 now opens switch 32 to deenergize the electromagnets 33.

When the needle 20 is placed in groove 8 of the record 3, the first information detected is a super audible tone which is transmitted to the circuit 38 and causes the circuit 38 to be energized and thereby causes motor 39 to rotate one half revolution and rotate the lever 44. Rotation of lever 44 causes gears 35 and 46 to become engaged and also closes the switch 47 to turn on the motor 48 and the lamp 22 to commence rotation of the gear 35.

The audio is then passed to receiver 2 along the conductor 21 whereas the video is picked up by the lens system and light conducting rod 25 and converted by the tube 31 and circuitry 49 to proper electrical signals to operate the video portion of receiver 2.

When the record is completed, a further super audible signal is generated from the record 3 to turn off the circuit 38 and cause the motor 39 to turn one half revolution, thereby disengaging gears 35 and 46 by means of biasing spring 51 and opening the switch 47 to shut off motor 48 and lamp 22. If the second super audible signal is not sensed, lifting of the arm 19 will provide a signal to circuit 38 to perform the same function as the second super audible signal. In this manner the system is reset and ready for use again.

ABSTRACT OF DRAWING

In the drawings, like numbers refer to like parts, and for the purposes of explication, marshalled below are the numbered parts of the improved Audio and Video Transmitting and Receiving System for Use as an Educational Device:

(1) Reproducing system of this invention.
(2) Conventional television receiver.
(3) Recording disc medium of this invention.
(4) Disc record spindle aperture.
(5) Record outer transparent layer.
(6) Record outer transparent layer.
(7) Record intermediate opaque layer.
(8) Sound grooves in outer layers 5 and 6.
(9) Video information on opposite sides of opaque layer 7.
(10) Spindle turning motor.
(11) Power wiring for 10.
(12) Friction wheel.
(13) Friction disc.
(14) Shaft or spindle.
(15) Turntable base member.
(16) Turntable.
(16′) Bearing surface on bushing 17.
(17) Bushing.
(18) Casing for 1.
(19) Reproducing arm.
(20) Phonograph needle.
(21) Wire conductor connection from needle 20 to sound reproducing circuit.
(22) Lamp.
(23) Lamp opening in arm 19.
(24) Lamp power wire.
(25) Light conducting rod.
(26) Joint of light rod 25 to lens system.
(27) Double convex lens or eyepiece.
(28) Objective lens.
(29) Tubular member for light.
(30) Enlarged end of light rod 25.
(31) Television pick up tube.
(32) Switch.
(33) Electromagnets.
(34) Magnetic material.
(35) Non-magnetic shutter gear element.
(36) Aperture (alignable with 30).
(37) Coils about 33.
(38) Circuit along 21.
(39) Motor.
(40) Eccentric wheel.
(41) Shaft of 40.
(42) Narrow band pass filter.
(43) Flip flop.
(44) Lever.
(45) Pivot for 44.
(46) Gear.
(47) Switch.
(48) Motor.
(49) Circuitry along 50.
(50) Conductor to 2.
(51) Biasing spring.
(52) Mirrors.
(60) Circuit of FIG. 9.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. In a closed circuit television system, a recording comprising a recorded audio region and a recorded video region, a television receiver having audio signal responsive means and video signal responsive means, means responsive to information in said recorded audio region to provide audio information to said audio signal responsive means and means responsive to information in said recorded video region to provide video information to said video signal responsive means, said means responsive to information in said recorded video region comprising a light conducting rod for transmitting said recorded video information and a television pickup means in the light path of and responsive to information on said light conducting rod to provide video signals to said video signal responsive means.

2. A system as set forth in claim 1 further including a microscope lens system positioned between said video information on said recorded video region and said light conducting rod.

3. A system as set forth in claim 2, said recording comprising a rotary record disc, said video information comprising a series of non-uniformity spaced video areas therein.

4. A system as set forth in claim 3, and light blocking means interposable in the light path between said light conducting rod and said television pickup means, and means for removing said light blocking means from said light path in synchronism with means for rotating said record disc to place each successive video area in said light path.

5. A system as set forth in claim 4, and means for moving said light blocking means at least approximately sixteen times per second.

6. A system as set forth in claim 4, said light blocking means comprising a rotatable shutter element having at least one light transmitting area therein, said means for moving said light blocking means comprising magnetic responsive means thereon, motor means engagably geared thereto, eccentric means for engaging said motor means therewith, and electro-magnetic means biasing said magnetic responsive means on said rotatable shutter element to actuate said shutter element to place said shutter element light transmitting area in said light path while said geared motor gear and shutter gear are disengaging responsive thereto.

7. A system as set forth in claim 6, and means for engaging said engagable motor means into engagement with said shutter element, said engaging means comprising a pivoted lever on one end of which said motor means is mounted for engagement with and disengagement from said shutter element, means biasing said motor end of said lever toward motor disengaged position, and an eccentrically axled rotatable wheel abutting the other end of said lever biasing said lever to bias said engageable motor into engagement with said shutter element, and means for rotating said eccentrically axled wheel in synchronism with said means for rotating said rotary record disc.

8. In a closed circuit television system, a recording comprising a rotary disc record, said record having a recorded audio spiral and a recorded video spiral, said video spiral comprising a series of microscopic video areas, means to rotate said disc record, means responsive to said spirals when said disc record is rotating to translate said audio and video spirals into audio and viewable information, the ratio of video areas to one second of audio information when said disc record is rotated being at least sixteen video spiral areas to one second of audio spiral, said translating means comprising means for rotating said disc record, a record player arm, means carried by said arm responsive to said audio spiral for tracking said audio spiral and transmitting said recorded audio information thereon to a television receiver having audio signal responsive means and video signal responsive means, a microscope carried by said arm scanning said series of video areas, a light conducting rod carried by said player arm for transmitting the information on said recorded video areas received through said microscope to a television pickup of said television receiver and thus to said video responsive means thereof.

9. A system as set forth in claim 8, and a light shutter in the path of light between said light conducting rod and said television pickup, said light shutter having a light blocking area and a light transmitting area, and means for moving said light shutter at least sixteen times per second between light transmitting and light blocking position in synchronism with the scanning of said video spiral areas by said microscope.

10. A system as set forth in claim 9, said light shutter comprising a rotary geared disc, shutter aligning means comprising means on said shutter disc, magnetic means biasing said magnetic responsive means to bias said shutter disc to light transmitting position, a gear element on said shutter disc, a motor operated constantly rotating gear element engageable with said shutter disc gear element, a motor operating said rotating gear element, a pivoted lever on one end of which said motor and operated gear element are mounted, means biasing said motor gear element away from said shutter gear element permitting said magnetic means to bias said shutter to light transmitting position, a second motor operating an eccentrically pivoted rotary wheel thereon biased against a side edge of the other end of said pivoted lever to bias and hold said lever to gear elements engaging position, said second motor being synchronized with the scanning of said video spiral areas.

11. A system as set forth in claim 10, said pivoted shutter disc having two diametrically opposed light transmitting areas, two magnetic responsive means similarly disposed thereon, said magnetic biasing means comprising two electromagnetic means and electromatic means energizing and deenergizing means synchronized with the scanning of said video spiral areas.

References Cited

UNITED STATES PATENTS

| | | | |
|---|---|---|---|
| 1,933,057 | 10/1933 | Harkin | 352—103 |
| 3,198,880 | 8/1965 | Toulon | 178—6.7 |
| 3,235,672 | 2/1966 | Beguin | 178—6.7 |

FOREIGN PATENTS

| | | |
|---|---|---|
| 605,221 | 12/1937 | Germany. |

ROBERT L. GRIFFIN, *Primary Examiner.*

H. W. BRITTON, *Assistant Examiner.*